(No Model.)
W. STRANDERS.
SLICED PICTURE.
No. 280,878. Patented July 10, 1883.
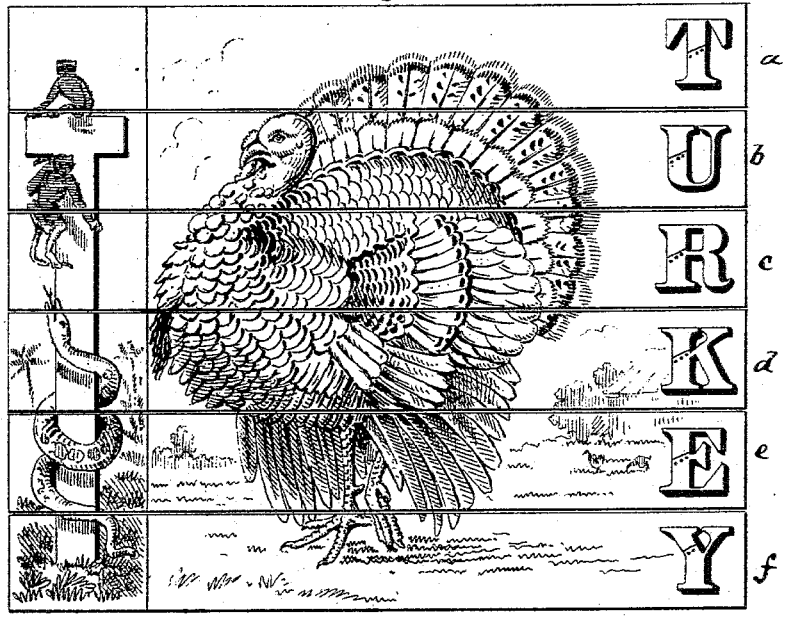
WITNESSES:
INVENTOR
Walter Stranders
BY Briesen & Steele
his ATTORNEYS

UNITED STATES PATENT OFFICE.

WALTER STRANDERS, OF NEW YORK, N. Y., ASSIGNOR TO EZRA H. SNOW, OF ORANGE, NEW JERSEY.

SLICED PICTURE.

SPECIFICATION forming part of Letters Patent No. 280,878, dated July 10, 1883.

Application filed April 4, 1883. (No model.)

*To all whom it may concern:*

Be it known that I, WALTER STRANDERS, of New York, in the county and State of New York, have invented a new and useful Improvement in Sliced Pictures, of which the following is a specification.

This invention relates to sliced pictures, and has for its object to spell out by the letters of the alphabet the name of the picture or figure when completed; also at the same time to build up the capital initial letter of the name of the object produced by putting the slices together. Thus when the separate slices are set next to each other in their regular order the result on one side is a complete capital letter, a complete figure of the object, and the complete name of the object spelled out. But another object of my invention is to so arrange the letters and figures on the slices that although the same slices serve to form part of as many pictures as there are sides to each slice, (as each side of each slice has some portion of a picture, together with a single letter belonging thereto,) yet when one picture is completed and perfect the opposite side of the slices will not show a complete picture, no complete name of an object, or its capital initial letter, but will show the blocks in irregular and confused order.

Figure 1 is a front view of a series of my slices so arranged as to spell the word "Turkey," the slices at the same time illustrating the figure of a turkey, and also serving to build up the capital initial letter "T," as shown. Fig. 2 shows the other side of the same slices that are used in Fig. 1, illustrating the appearance of the other side of said slices when they are arranged on one side to illustrate the word "Turkey" and the figure thereof.

The letters *a b c d e f* indicate the slices that are shown in Figs. 1 and 2.

It will be perceived that five of the slices in Fig. 2, when arranged in proper order—to wit, in the order *a d f b e*—would spell the word "Macaw," and also illustrate the figure of a macaw, and serve to build up the capital initial letter "M," leaving the additional slice *e*, containing the letter "E," for use in a third picture. When so arranged, the word and figure of a turkey, which appear on the slices spelling the word "macaw," will be in confused order. Thus the person using the slices is forced to spell out each object and build up each capital letter by itself, and is not able by simply composing the word "Turkey," for example, to turn the blocks over and find the completed word and figure "Macaw," but must exercise his ingenuity in each separate case to build up each separate figure and spell out each separate name. The same idea and system are pursued in connection with each letter of the alphabet, the initial letter of the object named being in each case the capital letter, which is built up by joining together the slices composing the object in proper order.

I do not claim sliced pictures that have on each slice a letter and part of the picture, so that by joining the slices a full picture and a complete word will be obtained; nor do I claim placing words on each slice, all such being old.

I claim—

1. The combination of five (more or less) slices with each other, each containing a portion of a picture, one letter of the name of said picture, and a portion of the initial letter with which the name of the picture begins, all arranged substantially as herein shown and described.

2. In sliced pictures, the combination of the slices *a b c d e* with one another, each slice having on each face a letter and part of a picture and the portion of an initial letter, but all so arranged that only one complete word and picture can be produced at any one time by said slices, as specified.

WALTER STRANDERS.

Witnesses:
FREDK. J. NAYLOR,
F. J. LETBE.